United States Patent [19]

Predina

[11] Patent Number: 4,843,291

[45] Date of Patent: Jun. 27, 1989

[54] DIGITAL TO SYNCHRO CONVERTER

[75] Inventor: Joseph P. Predina, Fort Wayne, Ind.

[73] Assignee: ITT Aerospace Optical, a division of ITT Corporation, Fort Wayne, Ind.

[21] Appl. No.: 155,463

[22] Filed: Feb. 12, 1988

[51] Int. Cl.⁴ ............................................. G05B 19/31
[52] U.S. Cl. .................................... 318/605; 318/603; 318/632
[58] Field of Search ......................... 318/605, 603, 632

[56] References Cited

U.S. PATENT DOCUMENTS 4,342,077 7/1982 Passey et al. ......................... 364/183

Primary Examiner—William M. Shoop, Jr.
Assistant Examiner—Saul M. Bergmann
Attorney, Agent, or Firm—Robert A. Walsh; Thomas N. Twomey; Mary C. Werner

[57] ABSTRACT

A digital-to-synchro converter is provided where a binary input code specifies a desired shaft angle and where an resolver type position transducer is employed with additional circuitry to generate a shaft position error signal indicative of the angular difference between the desired shaft angle and the actual shaft angle. The additional circuitry corrects for known and calculated errors in the shaft position detection process and equipment.

7 Claims, 2 Drawing Sheets

DIGITAL TO SYNCHRO CONVERTER

The invention described herein was made in the performance of work under NASA Contract No. NAS5-29500 and is subject to the provisions of Section 305 of the National Aeronautics and Space Act of 1958, as amended (72 Stat. 435; 42 U.S.C. 2457).

FIELD OF THE INVENTION

This invention relates to an improvement over the prior art of digital to synchro converters used in feedback servo systems. The invention provides an extremely high quality signal representative of precise shaft angle of an inductosyn shaft.

More particularly, the invention accepts a binary digital word as an input representative of desired shaft angle and has circuitry which, when combined with a conventional resolver type position transducer such as that sold under the registered trademark INDUCTOSYN, produces an error voltage proportional to the difference between the desired position and the actual position of the resolver type position transducer shaft.

This invention removes the common sources of error generated by circuitry of the prior art, thus resulting in a more precise measurement of shaft angle error with greater linearity and better stability over long periods of time.

BACKGROUND AND SUMMARY OF THE INVENTION

Prior art techniques of measuring mechanical shaft angle are numerous. One such method is to use an electromechanical device generically called an resolver type position transducer. A typical resolver type position transducer would be comprised of two disks, one which rotates relative to the other. One of the disks would house the stator windings (does not move) while the other houses the rotor winding.

Generally, two separate windings are physically arranged on the stator so that electrical signals from these two windings are coupled in quadrature onto the rotor windings of the second member. The magnitude of the coupling for each of these winding pairs is dependent upon the mechanical shaft angle present between the stator and the rotor. Very often, numerous winding poles are configured into the device so that an electrical/mechanical geardown ratio is achieved. For example, a mechanical rotation of 180 degrees might correspond to an electrical phase shift of 18,000 degrees if the geardown ratio were 100 (corresponding to 200 pole pairs).

The relation between the input and output signals of an resolver type position transducer are related to the geometry of the resolver type position transducer stator and rotor windings. Since this geometry changes as the rotor changes its position, then it becomes possible to extract positional information by comparing the output and input signals of resolver type position transducer. Various methods of accomplishing this measurement have been devised using both amplitude and phase modulation techniques. U.S. Pat. No. 4,339,700 entitled "High Frequency Control System Using Digital Techniques" issued July 13, 1982 provides additional explanation of resolver type position transducer.

The present invention relies upon the fact that an resolver type position transducer can be used as a phase shifter of an input carrier frequency. Although the basic resolver type position transducer concept represents a technique which is well known to those versed in the state-of-the-art, the present invention is an improvement over the prior techniques resulting in greater accuracy of measurement. The invention also provides improvement in the linearity of measurement as opposed to alternate techniques such as those using multiplying D/A converters (an amplitude modulation technique). U.S. Pat. No. 4,339,700 also discloses the use of multiplying D/A converters.

The present invention is intended for extremely high-precision servo feedback systems which must adjust a rotating shaft to an accuracy of better than 1 part in 5,000,000 parts of a total rotation. This accuracy is achieved by a combination of two effects. The first effect is the result of decomposing a full 360 degree rotation mechanically into a much larger number of electrical rotations of phase. This aspect is achieved in the construction of the resolver type position transducer as described previously with numerous pole parts present in the inductosyn construction. Thus, in order to achieve an accuracy of 1 part in 5,000,000 for an resolver type position transducer which had 100 pole pairs, it would be necessary to design an electrical circuit capable of measuring an electrical phase angle to within 1 part in 50,000. The purity and accuracy of the signals to excite the resolver type position transducer must also have the same high precision as the circuits used to measure differences in input and output signal characteristics.

FIG. 1 represents a prior art technique. In this arrangement, quadrature carrier frequencies having the same amplitude are provided by an oscillator 101 and are fed into the two resolver type position transducer stator inputs 121, 122. The output signal from the rotor will be a carrier having the same frequency but with a phase shift added to it. If one were to compare this phase shifted signal with another version of the reference phase shifted by accurate methods, then the difference between these two signals would result in a null output from phase comparator 108 for a specific mechanical shaft angle. The error signal could then be used to direct a servo motor to adjust shaft angle in order to reduce the error.

The problems encountered in the prior art are several and have, in fact, resulted in a tendency to avoid the use of phase shifting methods. The major problems encountered in the prior art phase shifting approaches are:

Poor Amplitude Balance of Quadrature Drive Signals

Although quadrature carriers at low frequency are easily generated by digital circuitry, in order for the resolver type position transducer to produce accurate electrical phase shift at its output, it becomes necessary to balance input amplitudes of these quadrature signals to high accuracies. For example, if a 128 pole pair resolver type position transducer is used, and a mechanical shaft angle accuracy of 1 microradian is desired, then the amplitude balance of the quadrature signals must be accurate to within 128 parts per million. This is generally beyond the accuracy of most digital logic circuits used to produce quadrature carrier frequencies. Moreover, typical digital logic circuits cannot drive the resolver type position transducer stator windings directly. Instead, driver amplifier units 104, 105 usually need to be inserted between the SIN/COS generator 102 and the resolver type position transducer 106 as shown in FIG. 1. The signal balance maintained between these two channels from all sources would need to be held beyond the precision practicably obtainable.

Drive Signal Cross Talk

Cross talk between the two channels driving the resolver type position transducer stator, would tend to skew the drive signals from the quadrature relationship. In order to maintain a hundred part per million accuracy, a signal isolation greater than 80 dB would be required. This is extremely difficult to achieve at low frequencies because conventional shielding techniques are ineffective at the low frequencies used to drive typical resolver type position transducers. Cross talk between resolver type position transducer windings also has the same detrimental effect.

Harmonic Content of Drive Signal Introduces Errors

Accurate quadrature generation of the resolver type position transducer drive signals requires the use of digital logic circuits. The resultant signal, instead of being sinusoidal in nature, is rich in harmonics which also enter the resolver type position transducer. Since the resolver type positon transducer will shift the harmonic signals differently than it shifts the fundamental sinusoid, then considerable energy exists at the resolver type position transducer output at frequencies different than the primary fundamental measurement frequency. This interference is further magnified by the fact that an resolver type position transducer has a greater transfer efficiency at higher frequencies than low frequencies. Thus, the harmonic interference will appear at a higher level relative to the fundamental signal than what it had appeared at the input of the resolver type position transducer. Eliminating this problem requires placement of a very selective bandpass filter at the output of the resolver type position transducer to eliminate any harmonic content for subsequent processing. This highly selective bandpass filtering would normally be incorporated into the preamp 107 shown in FIG. 1.

The highly selective bandpass filter required to eliminate harmonic content of the signal will also introduce a significant and somewhat unpredictable phase shift of the fundamental itself. Based upon the accuracy of the electronic components to build analog filters at low audio frequencies, it is known that the uncertainty and phase shift produced by such a bandpass filter as required in FIG. 1 will introduce errors of 10 to 100 times the desired accuracy of the system.

Staleness Error

In applications where it is desired to rotate the shaft at a constant angular velocity, then the phase shifting resolver type position transducer approach using digital phase shifting techniques shown in FIG. 1 suffers from a phenomena called "staleness" error. "Staleness" error becomes more pronounced for higher shaft angular velocities or for longer-time intervals between digital position updates. The problem stems from the fact that the digital position which controls resolver type position transducer movement is clocked into the circuitry at a fixed and repetitive rate. The application of this data by the digital phase shifter 103 of FIG. 1 lags in time. This time varies in proportion to the desired phase shift programmed into the digital phase shifter. Upon completion of a 360 degree phase shift, this time lag suddenly reverts to a 0 time lag and repeats itself. The end result is a saw-toothed waveform at the resolver type position transducer output. The magnitude of this saw-tooth waveform as well as its period is dependent upon the resolution of the digital phase shifter, the speed of shaft rotation, and the reference drive frequency.

The present invention eliminates these four major sources of error in prior art methods which have prevented precision performance from being obtained.

It is an object of the present invention to improve the prior art technique of digital to synchro converters which use phase shifting methods.

It is another object of the present invention to provide a design for precision circuitry which accomplishes the signal processing functions unique to this apparatus.

The prior art problems connected with the generation of accurate quadrature drive signals and the unpredictable phase shifts caused by a narrow bandpass filter have been eliminated according to the invention by combining the bandpass filter, drive circuitry, and three feedback signal processing networks that remove the errors of amplitude imbalance, quadrature phase mismatch, and bandpass filter delay uncertainty. The staleness error associated with a constant velocity servo system has been compensated with an inverse error signal generation and nulling.

DETAILED DESCRIPTION OF THE INVENTION

Figure 1:
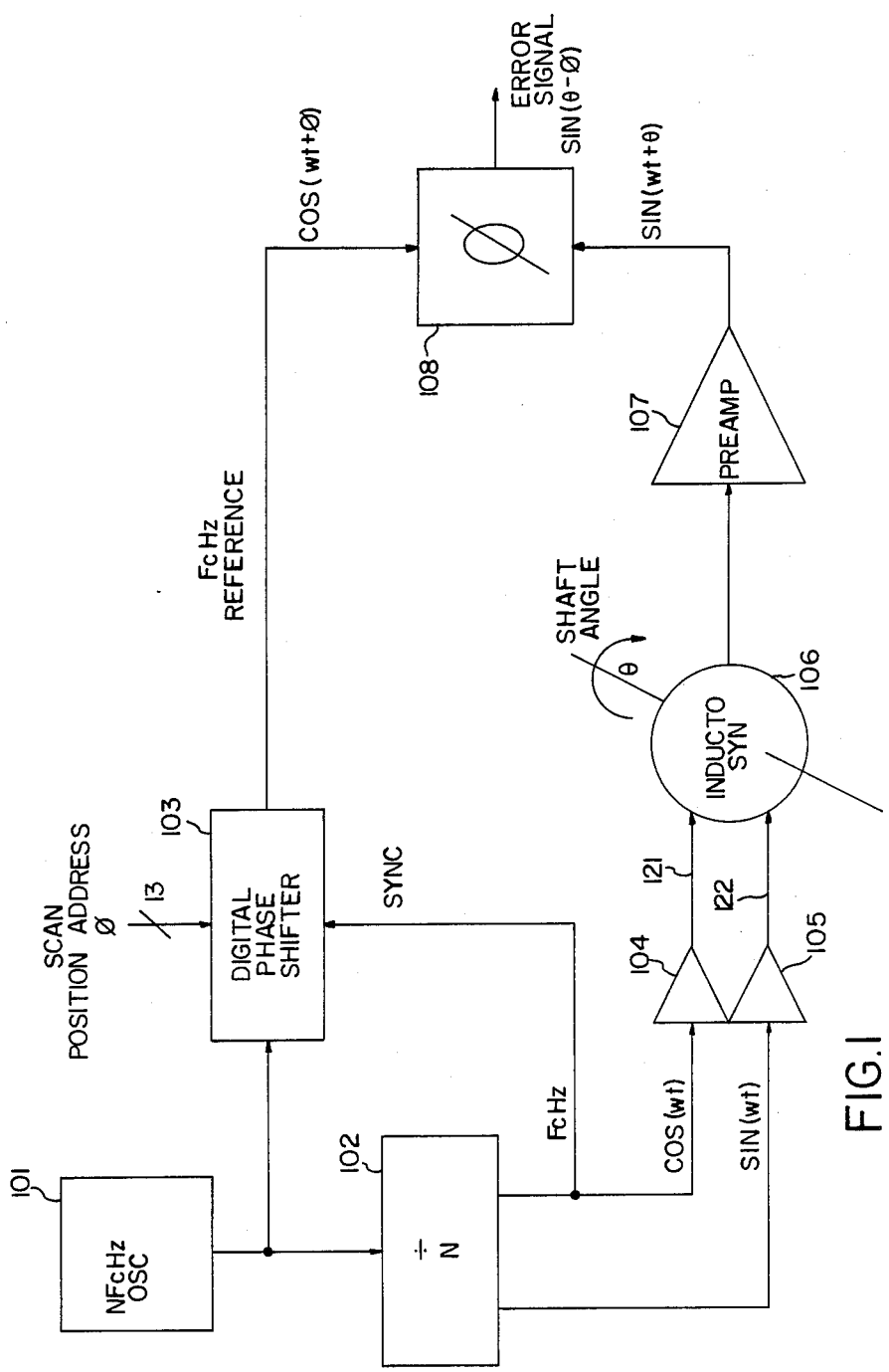
Figure 2:
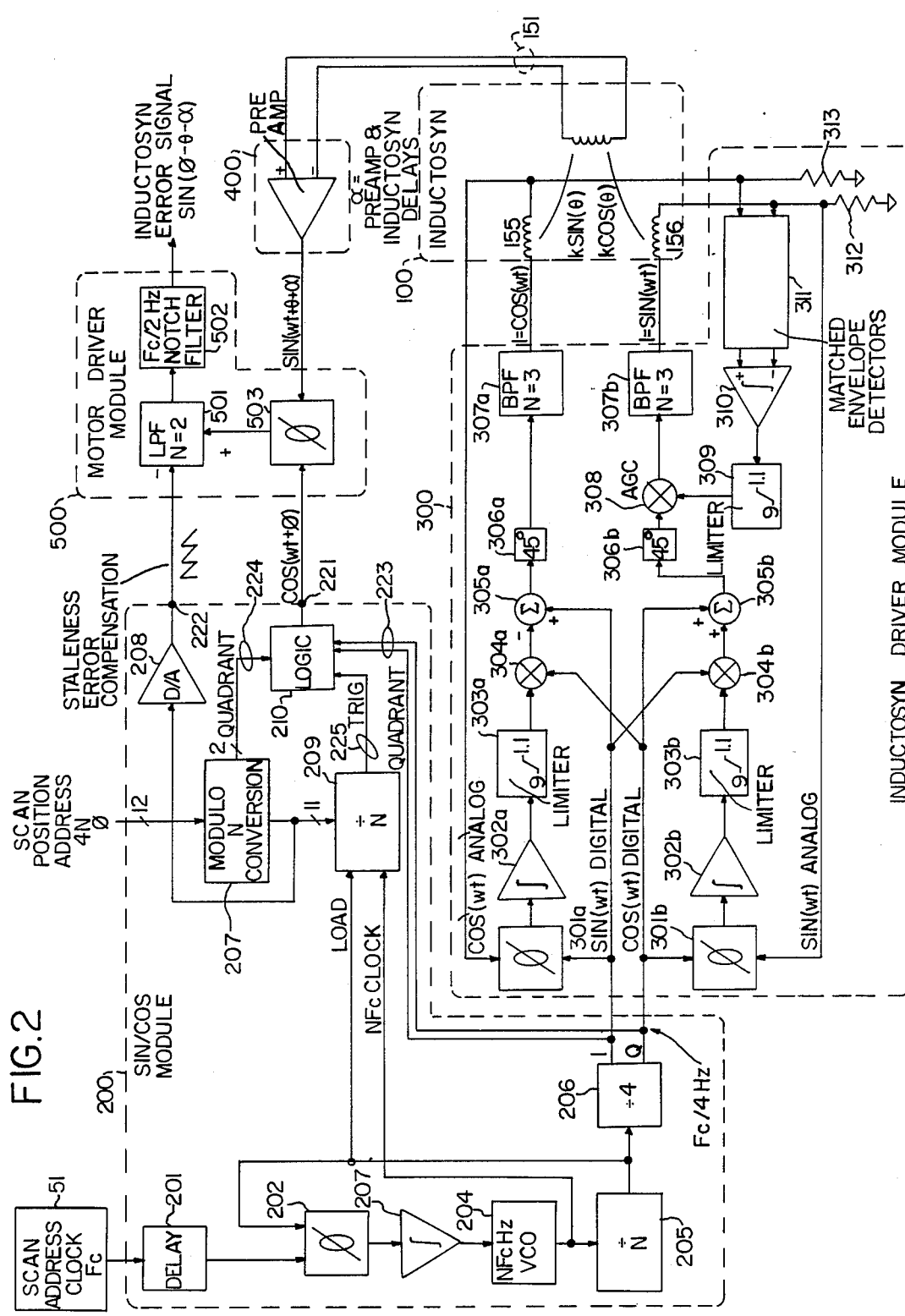

FIG. 2 illustrates the improved concept. The major functional elements of the system can be broken down into five blocks.

Resolver Type Position Transducer 100
SIN/COS Module 200
Resolver Type Position Transducer Driver Module 300
Preamplifier 400
Motor Driver Module 500

The selection of these particular modules and the novel interconnection between the respective modules result in the improved apparatus and operation of this invention.

The resolver type position transducer 100 is conventional, having low winding resistance and a large number of pole pairs which achieve a high electrical to mechanical gear-down ratio. Coupling between the stator and rotor windings of the resolver type position transducer is quite low which necessitates an amplifier 400 connected to the module rotor output 151 for amplification of the resolver type position transducer output signal.

The SIN/COS module 200 transforms a digital word (SCAN POSITION ADDRESS) corresponding to the desired resolver type position transducer shaft position into an encoded signal compatible with driving the resolver type position transducer and its associated detection circuitry by use of Module N Conversion circuit 207. Changes in the scan position address digital word are synchronized to an external clock 51 also applied to the module. For the example of FIG. 2, the electrical phase shift of 360 degress is broken down into 4N equal segments. An resolver type position transducer drive frequency of Fc/4 Hz has been chosen in this example, which is derived from a high-speed clock 204 that is phase locked to Fc. The phase locking of the VCO 204 allows synchronous transfer of scan address data in the form of a scan position address digital word into the SIN/COS module 200. The frequency of the VCO 204 is N times Fc.

Logic within the SIN/COS module decomposes the scan position address into four quadrants, thereby allowing the scan position address to be updated at a rate four times the resolver type position transducer drive frequency. Using known phase lock loop and quadrature signal generation techniques, the SIN/COS board in wave generator 206 synthesizes digital squarewaves having a 90 degree phase different at the resolver type position transducer drive frequency Fc/4. In addition, a third cosine squarewave is synthesized in logic circuit 210 having a phase shift which is programmed by the scan position address word. The digital phase shifting is accomplished using a synchronous counter 209, logic 210, and modulo N circuitry as shown in FIG. 2. This novel arrangement allows updating position information (and hence programmed phase shift) at a rate of four times every resolver type position transducer drive carrier cycle. Four repetitive quadrants are defined by the I and Q digital outputs 223 of wave generator 206. The modulo N converter 207 determines which of these four quadrants will contain the low to high transition of cos (wt+$\phi$) signal 221. Modulo N converter 207 also determines how many clock cycles into the quadrant a positive transition is to occur. Synchronous counter 209 counts off these clock cycles and produces a trigger at the appropriate time. If the quadrant signals 223 and 224 match, then the trigger signal 225 produces the positive transition of cos (wt+$\phi$) digital signal 221. If the complement of quadrant signal 224 (the quadrant 180° out of phase) happens to match quadrant signal 223, then the negative transition of cos (wt+$\phi$) digital signal 221 is allowed to occur when triggered by 225.

The phase shifted digital cosine wave from the SIN/COS module carries information (scan position address) delayed from the time the information was latched in. This delay varies anywhere from zero to N clock cycles. For a servo system having constant shaft velocity, this delay modulation causes an artificial error to be developed at the output 221 of the motor driver module. The error voltage is sawtooth in nature and can be compensated by synthesizing a similar sawtooth signal and subtracting. A D/A converter 208 connected to the Modulo N Conversion 207 in FIG. 2 develops the appropriate signal which is provided at output 222 of module 200 and summed into the motor driver module 500 via low pass filter 501, phase detector 503 and notch filter 502 to provide an error signal.

The resolver type position transducer driver module 300 contains functional elements which cooperate in providing other improvements offered by the present invention. The resolver type position transducer driver module 300 preconditions the digital SIN/COS squarewaves to produce highly pure harmonic-free SIN waves having precise amplitude match and quadrature balance. This is achieved by use of three feedback correction networks which operate on sampled signals from the resolver type position transducer. A bandpass filter eliminates the troublesome harmonic content of the drive signals while phase shift errors caused by the bandpass filter are compensated by the feedback circuitry.

Current sensing resistors 312, 313 allow precise measurement of each of the signals driving the stator windings 155, 156 of the resolver type position transducer. Matched envelope detectors 311 having better than 100 parts per million precision match between parallel channels allow precise measurement of amplitude imbalance on the drive signals. By integrating this error in integrator 310, a correction voltage is developed and limited by limiter 309 that controls an AGC circuit 308. This is built into the lower channel of the resolver type position transducer driver module of FIG. 2. The matched envelope detector 311 can be constructed by many means using current state-of-the-art techniques known to any experienced designer.

The resolver type position transducer driver module 300 also maintains precise phase tracking between the analog COS/SIN waveforms (without harmonic content) and the digital SIN/COS squarewaves used as input to the resolver type position transducer driver module. The current sensing resistors 312, 313 used to develop a voltage for the matched envelope detectors are also used to develop the same voltage for a pair of precision phase detectors 301a, 301b as shown in FIG. 2. These 90 degree phase detectors produce an error voltage whenever their inputs deviate from perfect quadrature. This error voltage is then integrated in integrator(s) 302a, 302b and limited by limiters 303a, 303b and used to control the ratio of combining in combiners 304a/305a, 304b/305b between the SIN/COS channels. A resultant phase shift can be produced in this way at the fundamental drive frequency. A ratio difference of ±10% is allowed via the limiter circuits 303a, 303b on the resolver type position transducer driver module of FIG. 2. This, in turn, allows approximately ±9 degree phase shift control of the signal driving any one particular resolver type position transducer winding.

Since the SINE and COSINE channels are combined with approximately the same amplitude, this produces a cosine wave which is 45 degrees shifted with respect to the digital cosine wave used as input to the resolver type position transducer driver board. Hence, a 45 degree phase shift is provided by an analog low pass filter 306a whose cutoff frequency is adjusted to equal the resolver type position transducer drive frequency. A similar technique is used on the other resolver type position transducer drive channel via low pass filter 306b to produce the SINE drive.

As a consequence of the three feedback networks described above, it becomes possible to drive the resolver type position transducer with near-perfect quadrature current sources whose accuracy is solely tied to the accuracy of the phase detectors and matched envelope detectors of the resolver type position transducer driver module. Precisions of 100 parts per million can be achieved via several techniques using current state-of-the-art circuit design for these elements. The current sources are inherently a part of the bandpass filters 307a, 307b in driver module 300.

Another advantage of the resolver type position transducer driver module depicted in FIG. 2 rests on its insensitivity to channel cross talk. A high degree of isolation is not required in the processing circuitries between the COSINE and SINE channels as required in the prior art. Any such cross talk which does exist is corrected for and nulled out by means of feedback circuits. Thus, the only precision components required in the design of this circuitry are contained in the precision phase detectors 301a, 301b, envelope detectors 311 and matched current sensing resistors 312, 313.

A preamplifier 400 is the third element of this apparatus and is required to process the output signal 151 from the resolver type position transducer rotor. Any signal processing delay through this preamplifier will result in a phase shift of the resolver type position transducer rotor output signal. Even at low frequencies such as a few kilohertz, delays of tens of nanoseconds become significant. Unfortunately, the gain bandwidth of a solid state amplifier cannot be precisely controlled over a wide range of environmental conditions. Changes as high as 50 to 100% are typical for a high-gain amplifier using solid state technology. Therefore, the only way to control delay variations through the preamplifier is to construct a very wideband solid state amplifier and subsequently limit the bandwidth by precision low pass filter elements integrated within the amplifier design. The design of such an amplifier is well known and within the present state-of-the-art, and the use of such an amplifier in combination with the other blocks of FIG. 2 allows precision measurements to be made with this apparatus which could not be made in the past.

In combination with a preamplifier having very stable delay characteristics, the resolver type position transducer, likewise, must have the same type of delay stability. This is achieved by specifically using resolver type position transducer structures having very low winding resistance such as 1 to 10 ohms in combination with controllable current sources on the resolver type position transducer driver board to excite the stator windings. Any inductive or capacitive impedance of the resolver type position transducer then becomes inconsequential so long as the current sources remain balanced between both stator windings. This, of course, was achieved by feedback circuitry on the resolver type position transducer driver module as described previously.

The motor driver module compares the amplified resolver type position transducer rotor output with a phase shifted COSINE squarewave from the SIN/COS module. Assuming that the preamp and resolver type position transducer delays are negligibly small, then a comparison of phase between the resolver type position transducer rotor output and the phase shifted cosine wave will result in an error signal for the servo system. Once again, a precision phase detector 503 similar to that used on the resolver type position transducer drive module compares the phase of the signals from preamp 400 and SIN/COS module output 221. Subsequent low pass filtering in filter 501 and notch filtering in filter 502 of the phase detector output produces the required error signal. The notch filter 502 is centered at twice the resolver type position transducer drive frequency (same as Fc/2) to eliminate the sum frequency out of phase detector 503.

While the present invention has been described with respect to various examples of specific implementations, it is to be understood that the full spirit and scope of the invention is not to be limited except as set forth in the claims appended hereto.

I claim:

1. A precision rotary shaft control system comprising:
   a resolver type position transducer;
   a motor driver circuit;
   an address signal circuit; and
   a resolver type position transducer drive circuit comprising first means for generating a drive signal for said resolver type position transducer and second means for providing precision feedback to said first means; and
   wherein said second means comprises precision phase detector means in the current path of said drive signal for comparing the phase of said drive signal with the phase of an address signal provided by said address signal circuit; and
   wherein said second means further comprises precision current sensing resister means in said current path and connected between a reference potential and said resolver type position transducer whereby said phase detector means detects said drive signal with precision.

2. A precision rotary shaft control system according to claim 1, wherein said drive signal comprises a SIN (wt) and a COS (wt) signal pair; and
   said second means further comprises matched envelope detector means for detecting said signal pair.

3. A precision rotary shaft control system according to claim 2, wherein said second means further comprises automatic gain control circuitry associated with said matched envelope detector means for providing precision amplitude matching of said signal pair.

4. A precision rotary shaft control system comprising:
   a resolver type position transducer;
   a motor driver circuit;
   an address signal circuit; and
   a resolver type position transducer drive circuit comprising first means for generating a drive signal for said resolver type position transducer and second means for providing precision feedback to said first means; and
   wherein said address signal circuit provides a desired rotor position signal; and
   wherein said motor driver circuit comprises a phase detector for comparing said desired rotor position signal with said actual rotor position signal and generating a rotor position error signal; and
   wherein said motor driver circuit further comprises a low pass filter adapted to receive a staleness error compensation signal and said rotor position error signal and to generate a corrected rotor position error signal.

5. A precision rotary shaft control system according to claim 4, wherein said motor driver circuit further comprises a notch filter for receiving said corrected rotor position error signal and providing a resolver type position transducer error signal.

6. An improved system for providing a resolver type position transducer error signal representative of a difference between a desired rotor position and an actual rotor position, said system comprising:
   (a) a resolver type position transducer adapted to receive a resolver type position transducer drive signal comprising a first SIN/COS signal pair and adapted to provide a rotor position signal;
   (b) a resolver type position transducer driver circuit adapted to receive a driver signal comprising a second SIN/COS signal pair and adapted to provide said resolver type position transducer drive signal, said resolver type position transducer driver circuit comprising a feedback network comprising:
   (i) phase detection means for correcting phase differences between said driver signal and said resolver type position transducer drive signal;
   (ii) matched envelope detector means for correcting amplitude differences in said first SIN/COS signal pair; and
   (iii) a pair of current sensing resistors;
   (c) an address circuit adapted to receive a scan address clock signal and a scan position address signal and adapted to provide said driver signal, a desired rotor position signal and a desired rotor position staleness error compensation signal; and (d) a motor driver circuit adapted to receive said rotor position signal and said desired rotor position signal and to provide said signal representative of the difference between a desired rotor position and an actual rotor position.

7. A high precision digital to synchro converter for use with a rotor comprising:

first means for receiving a scan address clock signal and a digital scan position address signal indicative of a desired position of a rotor and providing first and second sinusoidal signals and an encoded scan position address signal and a staleness error compensation signal associated with said encoded scan position address signal;

second means for receiving said first and second sinusoidal signals and providing first and second precision sinusoidal signals;

third means for receiving said first and second precision sinusoidal signals and providing a rotor position signal indicative of the rotor position; and fourth means for receiving said encoded scan position address signal, said staleness error compensation signal and said rotor position signal and for providing an error signal indicative of any variance of said rotor position from said desired rotor position.

* * * * *